No. 662,154. Patented Nov. 20, 1900.
H. J. SCHMICK.
VALVE FOR COMPRESSION ENGINES
(Application filed Nov. 24, 1899.)

(No Model.)

Witnesses:
F. L. Ourand
W. P. Reinohl

Inventor:
Henry J. Schmick
By D. C. Reinohl
Attorney.

THE NORRIS PETERS CO., PHOTO-LITHO., WASHINGTON, D. C.

UNITED STATES PATENT OFFICE.

HENRY J. SCHMICK, OF HAMBURG, PENNSYLVANIA.

VALVE FOR COMPRESSION-ENGINES.

SPECIFICATION forming part of Letters Patent No. 662,154, dated November 20, 1900.

Application filed November 24, 1899. Serial No. 738,215. (No model.)

*To all whom it may concern:*

Be it known that I, HENRY J. SCHMICK, a citizen of the United States, residing at Hamburg, in the county of Berks and State of Pennsylvania, have invented certain new and useful Improvements in Valves for Compression-Cylinders; and I do hereby declare the following to be a full, clear, and exact description of the invention, such as will enable others skilled in the art to which it appertains to make and use the same.

My invention relates to compression-cylinders, and has especial reference to valves which may be used as induction or eduction to supply and discharge the air or gas; and it consists in certain improvements in construction which will be fully disclosed in the following specification and claims.

Figure 1:
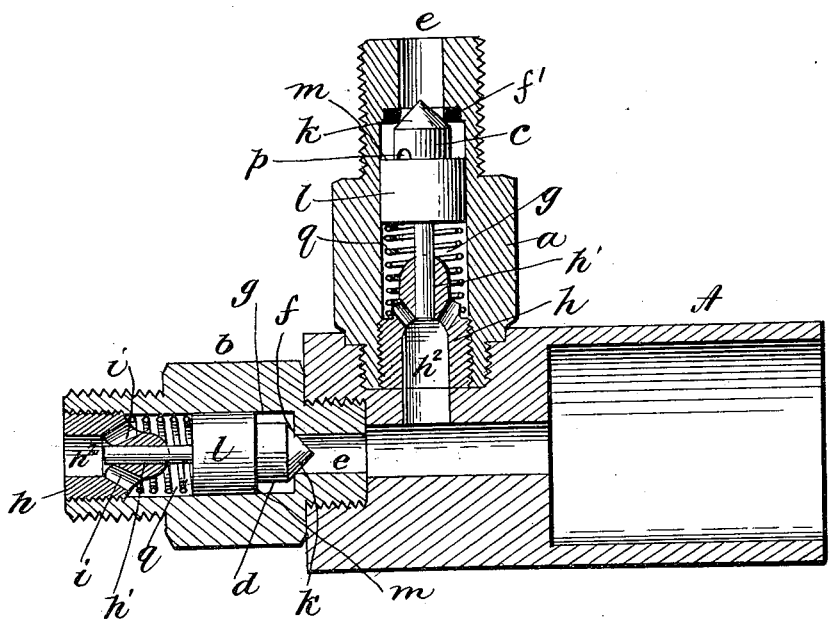
Figure 1:
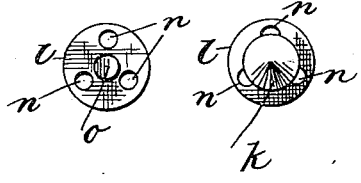
Figure 1:
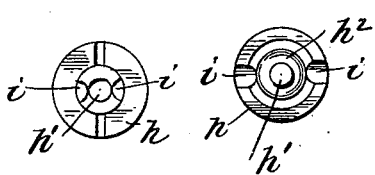

In the accompanying drawings, which form part of this specification, Figure 1 represents a vertical longitudinal section of my invention; Fig. 2, an end view of the valve; Fig. 3, a like view of the opposite end of the valve; Fig. 4, a plan of the outer end of the plug in the cage, and Fig. 5 a like view of the inner end of the plug.

Reference being had to the drawings and the letters thereon, A indicates the cylinder, which is provided with valve-cages $a$ $b$ and valves $c$ $d$, the valve $c$ as applied in this instance being the induction-valve and $d$ the eduction-valve, both of which are exact duplicates of each other applied in opposite relation for the purposes indicated. The cages are provided at one end with a passage $e$, at the inner end of which is a valve-seat $f$, which may be of metal, as shown at $f$, or rubber, as shown at $f'$, the latter for use when working under low pressure, and adjacent thereto is a cylindrical chamber $g$, and at the opposite end of the cage is a plug $h$, having a passage $h'$ through the center to serve as a guide for the stem of the valve, and in the end of the plug is an air or gas chamber $h^2$, which is connected with the chamber $g$ in the valve-cage by passages $i$ $i$. The cages are provided at each end with screw-threaded extensions $x$ $x'$, by which they are secured to the cylinder at one end, and a pipe may be connected to the opposite end by a suitable union or coupling (not shown) to conduct a fluid to be compressed to or from the cylinder. The valves are provided with a conical end $k$ to form a tight joint under high pressure, a cylindrical body $l$ of greater diameter than the valve forming a shoulder $m$, against which pressure is exerted to hold the valve away from its seat when the valve is taking or discharging air, as the case may be, and said body fits the chamber $g$ to hold the valve in proper alinement with its seat. The body $l$ is provided with passages $n$ for air or gas, and these passages are arranged around the stem $o$ of the valve and are bored so as to cut into the valve itself and form a shoulder at the end of the passage, as shown at $p$, against which the air or gas under pressure presses to hold the valve to its seat, and the valve is held to its seat normally by a spring $q$ in the chamber $g$ between the body $l$ and the plug $h$.

Having thus fully described my invention, what I claim is—

1. A valve for compression-cylinders, comprising a cage having a screw-threaded extension at each end, a cylindrical chamber, and a valve-seat at one end thereof; in combination with a valve having a cylindrical body of greater diameter than the valve, provided with passages extending through the body from end to end, a valve-stem, and a plug in the opposite end of the cage provided with a central passage for the valve-stem and passage for air or gas, and a spring for returning the valve to its seat.

2. A valve for compression-cylinders, comprising a cage having a screw-threaded extension at each end, a cylindrical chamber, and a valve-seat at one end thereof; in combination with a valve having a conical end, a cylindrical body the diameter of the chamber in the cage and having passages extending through the body from end to end around the valve, a valve-stem, and a plug in the opposite end provided with a central passage for the valve-stem, and passages for air or gas, and a spring for returning the valve to its seat.

3. A valve for compression-cylinders, comprising a cage having a screw-threaded extension at each end, a cylindrical chamber, and a valve-seat at one end thereof; in combination with a valve having a cylindrical body the diameter of the chamber in the cage and having passages through the body around the valve and extending from end to end of the body, a valve-stem, and a plug in the opposite end of the cage provided with a central passage for the valve-stem, an air or gas chamber in the outer end of the plug, passages through the plug communicating with said chamber and with the valve-chamber, and a spring for returning the valve to its seat.

4. A valve for compression-cylinders, comprising a cage having a screw-threaded extension at each end, a cylindrical chamber, and a valve-seat at one end thereof; in combination with a valve having a cylindrical body of greater diameter than the valve and provided with air-passages extending through said body from end to end and into the valve forming a shoulder in the valve at one end of each passage, and suitable air-passages in the valve-cage.

In testimony whereof I affix my signature in presence of two witnesses.

HENRY J. SCHMICK.

Witnesses:
 D. C. REINOHL,
 W. PARKER REINOHL.